3 Sheets—Sheet 1.

J. J. PIGGOTT.
HARVESTER.

No. 175,157. Patented March 21, 1876.

ATTEST:
Charles Pickles
Chas. J. Gooch

INVENTOR:
Jabez J. Piggott
By Knight Bros.
Attys.

3 Sheets—Sheet 2.

J. J. PIGGOTT.
HARVESTER.

No. 175,157. Patented March 21, 1876.

ATTEST:
Charles Pickles
Chas. J. Gooch

INVENTOR:
Jabez J. Piggott.
By Knight Bro.
Attys

3 Sheets—Sheet 3.

J. J. PIGGOTT.
HARVESTER.

No. 175,157. Patented March 21, 1876.

ATTEST:
Charles Pickles
Chas. J. Gooch

INVENTOR:
Jabez J. Piggott
By Knight Bro.
Attys.

UNITED STATES PATENT OFFICE.

JABEZ J. PIGGOTT, OF ST. LOUIS, MISSOURI.

IMPROVEMENT IN HARVESTERS.

Specification forming part of Letters Patent No. 175,157, dated March 21, 1876; application filed August 13, 1875.

*To all whom it may concern:*

Be it known that I, JABEZ J. PIGGOTT, of the city and county of St. Louis and State of Missouri, have invented a certain new and useful Binding Apparatus for Harvesters, of which the following is a specification:

This invention consists in the provision, back of the sickle-bar of a reaper or harvester, of a pivoted spring-platform, on which the grain falls as it is cut, and from which it is swept back into the bunching and binding mechanism by a rotary and adjustable rake. The binding mechanism is arranged on the back part of the platform, which is raised above the front portion. A hanging gate is arranged back of the spring platform, under which the cut grain passes, and which catches and prevents the grain from being raised by the wind and thrown forward upon the rake or spring platform after it has been carried off it by the rake. The reel-standards are jointed so as to be adjustable in inclination, and have two series of holes for horizontal and vertical adjustment of the reel. The bunching apparatus, which is arranged in the raised portion of the main platform, is composed of curved arms, one of which is fixed and two oscillating, the latter falling below the platform through a suitable opening in the same. One of these arms may be operated by foot or by a cam driven by proper connections with the main driving-power of the machine. The other arm is operated by the foot, and is used to additionally compress the sheaf-bunch and hold it while being tied. The arms aforesaid are made of two bars placed some distance apart, and connected together by pins carrying friction-rollers, on which is laid the straw band or the cord used in binding the sheaf.

Figure 1:
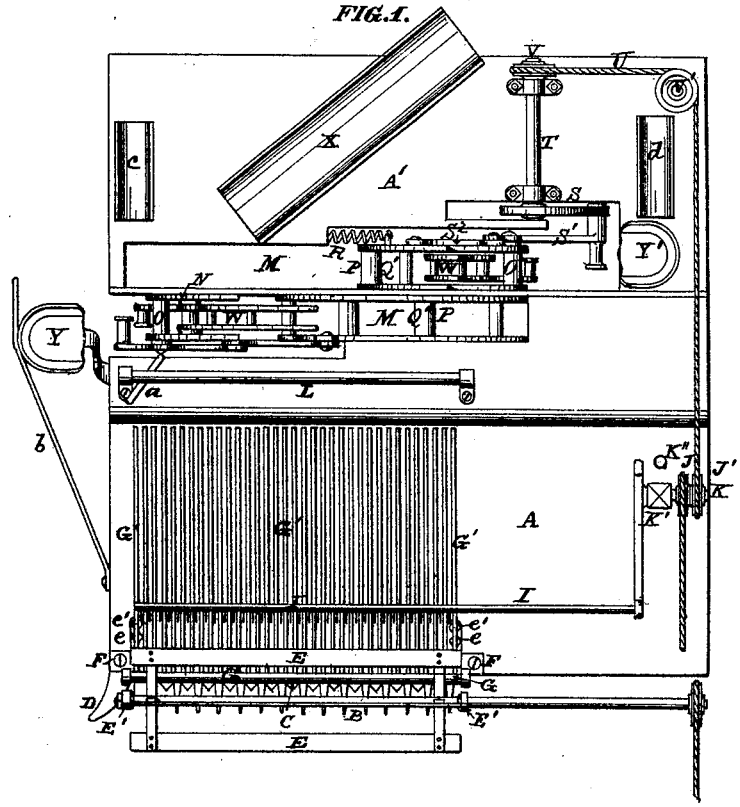
Figure 2:
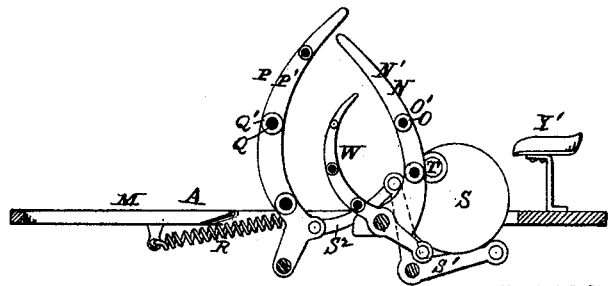
Figure 3:
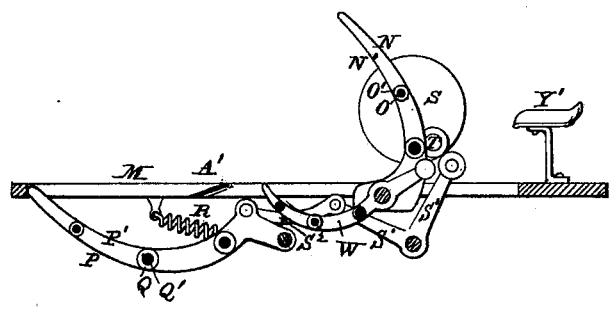
Figures 4, 5, 7:
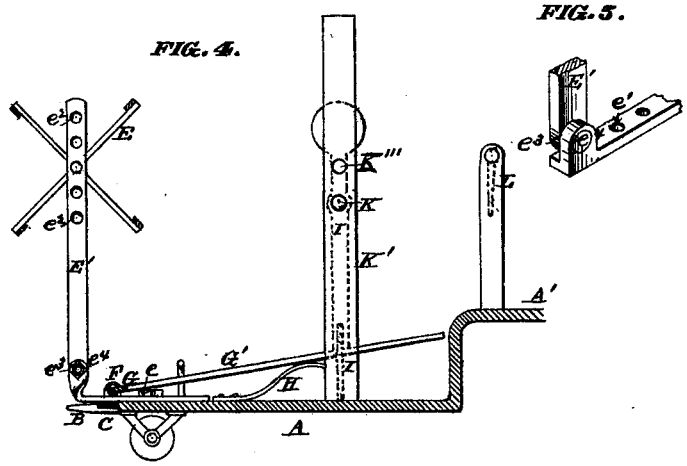
Figure 6:
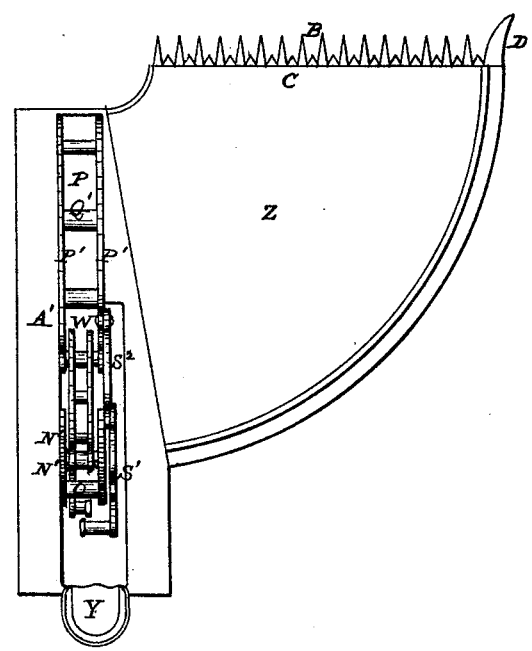

In the drawings, Figure 1 is a top plan of the apparatus. Figs. 2 and 3 are sections through the bunching apparatus, showing it in two positions. Fig. 4 is a detail section. Fig. 5 is a detail perspective of the reel-standard. Fig. 6 is a top view, showing the apparatus applied to a self-raker harvester. Fig. 7 is a section of a modification of the bunching apparatus.

A is the main platform of the machine supported on wheels in any suitable manner, and supplied with any suitable tongue, and other draft apparatus not shown, as no novelty is claimed on the same. The platform in its preferred form, as shown, has a rear part, A', elevated over the level of the front part, marked A. B B are the guard-fingers, and C the cutter-bar. D is the divider.

The standard-bracket $E^1$ of the reel E is attached to the platform by bolts $e$ passing through any of the holes $e^1$ in the horizontal arm, so that the bracket can be adjusted fore and aft in the platform by passing the bolt through the required hole. The vertical arm of the standard-bracket has a series of journal-holes, $e^2$, for the shaft of the reel E, and by changing the reel-shaft from hole to hole it is vertically adjusted.

The bracket-standards $E^1$ have joints $e^3$, so as to allow the adjustment of the reel by inclining the vertical arms, and they are fixed to their adjustments by tightening the nuts of the pintle-bolts $e^4$.

E F are brackets attached to the platform or finger-bar, giving pivotal bearing to the bar G. G' G', &c., are slats extending backward from the bar G, and with said bar constituting a spring-platform somewhat similar in construction to those in use upon dropper-harvesters. This dropping-platform rests on springs H, which hold it up at the rear part until the rake I comes down upon it and forces it down upon the springs by pressure upon the grain, as the latter is swept by the rake from the platform. The rake has rotation by a belt on the pulley J, which is upon the rake-arbor K, said arbor having bearing in either of the journal-holes $K'''$ in the standard K'. The holes $K''$ in the platform provide means for adjustment of the standard K'. The belt on pulley J may extend to a pulley on the ground-wheel axle-shaft, with which the arbor is parallel.

The rake has constant rotation, and as it descends it engages the grain upon the spring-platform at or near the butts of the straw, and carries the grain back from off the said platform, when the grain drops upon the raised portions A' of the platform, and is automatically bunched, and is bound by hand.

The platform G G' descends and then rises as the rake passes over it, so as to always occupy the same relative position in respect to the rake, so that the action of the rake upon the grain will be even and effectual. The slats G' act to keep the grain straight as it is carried back by the rake. L is a hanging gate, under which the cut grain passes as it is pushed onto the raised platform A', the object of which is to prevent the grain from being blown forward against the rake, and clogging and breaking it. It also acts to keep the grain from being tangled by the wind. The swing-gate I have shown of my preferred construction, with a number of teeth, pins, or slats similar to a rake, but a simple board pivoted at it upper edge would answer the purpose satisfactorily.

When the grain is left by the rake upon the raised part of the platform A' it lies across a slot, M, in the same, and in this slot work the arms of the bunching apparatus. This bunching apparatus has a fixed arm, N, consisting of two parallel curved upwardly-extending bars, N' N', connected by pins O, which constitute the arbors of anti-friction wheels O'.

P is an oscillating arm, which, like the fixed arm, is composed of two parallel curved bars, P' P', connected by arbor-pins Q with anti-friction rollers Q' thereon. The bars N' N' and those P' P' may be, respectively, eight inches, more or less, apart, so as to allow the introduction between them of the hands of the person binding. In use the band or cord is dropped upon the rollers O' Q' when the arm P is in its horizontal position, as shown in Fig. 3, and as the arm P is drawn upward, and to that N, the sheaf-bunch is compressed between the arms and the band or tie lapped around it ready for binding. The arm P is drawn down into its horizontal position by a spring, R, and is raised into its upper position by a cam, S, lever S¹, and link S². The shaft T of the cam S receives rotation from a belt, U, extending around pulleys V V', and to pulley J' on the rake-shaft K. The arm P may be raised by a simple treadle-arm attached to it, as shown at S³, Fig. 7.

The sheaf-bunch is held while being tied by the curved arm or cant hooks W, having at its end a treadle, so that the operator can, by depressing the treadle with his foot, hold the bunch as long as may be desired. When the foot is removed from the treadle the arm drops by its own weight, (and the pressure of the sheaf,) or may be drawn down by a spring to disengage the sheaf, which may then be thrown into the discharge-chute X.

My apparatus, as shown in Fig. 1, has duplicate binding-arms, so that an operative sits at each side of the machine, binding alternate sheaves. This duplicate arrangement is for use in cases where one binder is insufficient to bind the grain as fast as it is cut.

a is a deflector to turn the edge of the grain inward to the proper place for compression. c d are racks for reception of the binding bands or material. X is a trough or chute extending from near the off-side of the platform to the binder at the grain side. This trough receives the sheaf from the person binding and conveys it to the off-side, and drops it out of the track of the machine on the next round.

As a modification a secondary falling spring platform may be arranged under the one, G G', and projecting past the rear of same to receive the cut grain from said platform, and pass it onto the binding-platform A'.

In Fig. 6 the binder attachment is shown applied to the platform of a self-raking reaper.

In this construction the cut grain is carried around on the reaper-platform Z to the platform A', and over the opening M, by the usual rake of the reaper, to be bunched and tied by the mechanism before described. In this form of attachment a single binding mechanism is preferred.

I claim—

1. The combination of spring-platform G G', rake I, and harvester-platform A, substantially as set forth.

2. The combination of the spring-platform G G', rake I, and harvester-platform A, having a raised portion, A', substantially as set forth.

3. The combination of swinging gate L, rake I, and spring-platform G, substantially as set forth.

4. The combination of the fixed arm N, oscillatory arm P, and operating-lever S', with the curved holding-arm W, substantially as set forth.

5. The combination of fixed arm N and oscillatory arm P, spring R, operating-lever S¹, link S², and cam S, substantially as set forth.

6. The arm N, composed of bars N' N', united together by pins O, substantially as set forth.

7. The arm P, composed of bars P' P', united together by pins Q, substantially as set forth.

8. The arm N, composed of bars N' N', united together by pins O, carrying friction-rollers O', substantially as set forth.

9. The arm P, composed of bars P' P', united together by pins Q, carrying friction-rollers Q', substantially as set forth.

10. The adjustable standard K', in combination with the platform A, having holes K'', substantially as set forth.

11. The vertically-adjustable reel E, in combination with the vertically-adjustable rake I and adjustable standard K', substantially as set forth.

JABEZ J. PIGGOTT.

Witnesses:
SAML. KNIGHT,
CHARLES PICKLES.